United States Patent
Bryzik (10) Patent No.: US 11,753,158 B2
(45) Date of Patent: Sep. 12, 2023

(54) AIR VEHICLE'S DRIVE UNIT

(71) Applicant: Grzegorz Bryzik, Częstochowa (PL)

(72) Inventor: Grzegorz Bryzik, Częstochowa (PL)

( * ) Notice: Subject to any disclaimer, the term of this patent is extended or adjusted under 35 U.S.C. 154(b) by 346 days.

(21) Appl. No.: 16/872,323

(22) Filed: May 11, 2020

(65) Prior Publication Data
US 2020/0277050 A1 Sep. 3, 2020

Related U.S. Application Data

(63) Continuation-in-part of application No. PCT/PL2018/000106, filed on Nov. 5, 2018.

(30) Foreign Application Priority Data

Nov. 12, 2017 (PL) .................................. 423418

(51) Int. Cl.
B64C 29/00 (2006.01)
B64D 27/24 (2006.01)

(52) U.S. Cl.
CPC .......... B64C 29/0025 (2013.01); B64D 27/24 (2013.01)

(58) Field of Classification Search
CPC ....... F02K 3/065; F02K 1/64; B64C 29/0025; B64C 2201/162; B64C 39/024; B64C 11/001; B64C 27/20; B64C 11/48; B64C 27/18; B64D 27/24; B64B 1/34; B64B 1/36; B64B 1/26
USPC ...................................................... 244/23 B
See application file for complete search history.

(56) References Cited

U.S. PATENT DOCUMENTS

| 1,457,024 | A | * | 5/1923 | Franzen | B64B 1/40 244/29 |
| 1,728,404 | A | * | 9/1929 | Finley | B64B 1/26 244/73 R |
| 3,316,717 | A | * | 5/1967 | Castle | F02K 3/065 60/226.3 |
| 6,568,630 | B2 | * | 5/2003 | Yoeli | B64C 11/001 244/12.3 |
| 10,618,650 | B2 | * | 4/2020 | Hasinski | B64C 39/028 |
| 11,613,371 | B1 | * | 3/2023 | Romo | B64C 11/001 416/185 |
| 2008/0150083 | A1 | * | 6/2008 | Soma | H01L 29/6625 257/E21.375 |
| 2019/0048904 | A1 | * | 2/2019 | Neiser | B64C 11/001 |

FOREIGN PATENT DOCUMENTS

| DE | 29916203 U1 | * | 10/2000 | ........... B64C 11/001 |
| PL | 221132 B1 | * | 2/2016 | |
| WO | WO-2004002821 A1 | * | 1/2004 | ........... B64C 11/001 |

* cited by examiner

Primary Examiner — Jason H Duger
(74) Attorney, Agent, or Firm — Andrzej Malarz, Esq.

(57) ABSTRACT

A drive unit for air vehicle, which allows building the vertical take-off and landing vehicles, intended for use, for instance, in the production of flying taxis, as well as in the model-making branch and in the toy industry.
The drive unit is composed of the air channel, in the form of a straight segment of a tube with circular section, which has fans with engines fixed on its both ends. The vertical draft force outlet-inlet nozzle opening is located between fixed fans of the drive unit.

5 Claims, 6 Drawing Sheets

AIR VEHICLE'S DRIVE UNIT

CROSS REFERENCE TO RELATED APPLICATIONS

This application is a continuation-in-part application which claims the benefit of International Patent Application No. PCT/PL2018/000106, filed Nov. 5, 2018, and of Polish Patent Application No. P. 423418, filed on Nov. 12, 2017, the contents of each of which are hereby incorporated by reference.

FIELD OF INVENTION

This disclosure relates to a drive unit for a flying vehicle for use in the air industry, for instance in the production of flying taxis, as well as in the model-making branch and in the toy industry.

BACKGROUND

The solutions are known combining commonly known drive systems of aircrafts and helicopters or system which use propellers or turbines producing a vertical draft for vertical take-off and landing and then they change the direction of the draft into horizontal, by rotary change of position. The solutions of vertical take-off aircrafts are also known which change completely the position from vertical into horizontal.

From the published international application WO-2004002821-A1 the solution of an air vehicle drive device is known containing the fan placed in a tubular air channel and guides for distributing the air jet into two or more additional jets directed to the appropriate jet nozzles is known from. The device provides the vertical start and lifting force as well as the force for horizontal flight.

From the published application US 20080150083 a drive unit is known, fitted with a turbine with a distributor, placed in the air channel, longitudinally with the outlet chute of the ramjet engine. The distributor divides uniformly the flow of exhaust gas from the ramjet engine to two pairs of outlet nozzles, the outlet part of which is bent at an angle of 120° from the vertical, longitudinal axis of the nozzle.

From the Polish patent description PL221132 a drive of vertical take-off and landing air vehicle is known, fitted with an engine, which contains at least two pairs of air channels, located symmetrically on the right and left sides in relation to the aircraft axis. A turbine and a throttling valve, which serves for regulating the force of draft produced by the turbine and is located between the air inlet to the air channel and the turbine, are placed in each air channel. Each air channel includes a movable outlet nozzle at the outlet.

From the German utility model DE 29916203 U1 an aircraft with vertical take-off and landing is known. This solution describes a construction of an aircraft with vertical take-off and landing which does not have the disadvantages of a popular, conventional helicopter showing flight inefficiency and technical complexity of the drive components.

The solution disclosed in the utility model DE 29916203 U1 is characterized by agility and precision of hovering. The helicopter described therein may take-off and land vertically. Forces activated in it enable its vertical take-off thanks to the horizontal propellers built in the wings. The tilt of the vehicle is achieved by changing the draft of these propellers and the vehicle rotation is regulated by additional lamellae deflecting the air stream.

Forces generated on the tail by two opposing propellers in the vertical take-off and landing phase only allow the correction of the tail position by generating a corrective force only perpendicular to the longitudinal axis of the vehicle while, in the flight phase, only parallel to this axis.

Contrary to the known solution, in the present solution, constituting a subject of the present patent application, the generated resultant force creating a lift may freely change direction and force while moving along a vertical plane passing through the longitudinal axis of the drive unit from 90 degrees to 90 degrees in relation to the vertical axis of this drive unit (as shown in FIGS. 3, 4, 4a, and 5).

The helicopter disclosed in the prior art document DE 29916203 U1 has wings in which propellers generating vertical draft are fixed. However, the opposing propeller placed on the tail does not create lift but only a corrective force, it replaces the rear propeller in a helicopter (so that the helicopter does not revolve around its axis).

SUMMARY

The purpose of the present solution is to design such construction of drive which allows building the vertical take-off and landing air vehicles without equipping them with additional rotary drive elements or without equipping them in two drive systems, separately for vertical and horizontal flight.

According to the present solution the essence of the air vehicle drive unit, which has at least one air channel, the air channel being fitted with outlet-inlet nozzles openings and the drive, is that a fan (2) or fan (2') is fixed respectively on each ends of the air channel and that each fans of the drive is connected respectively with an independent engine for individual regulation of the draft force by each of them. One of the outlet-inlet nozzles openings is placed in a wall of the central part of the air channel, between fixed drive fans, and constitutes a vertical draft force outlet-inlet nozzle opening.

It is favorable when the vertical draft force outlet-inlet nozzle opening has a contour of rectangle with rounded corners, elongated in the direction of longitudinal axis of the air channel.

Most often, at least three drive units inseparably connected with each other form a stable drive system of the flying vehicle.

The drive unit is usually equipped with its own independent power supply system composed of battery pack and controller.

Typically, the drive unit housing has built-in catches for connecting several drive units in series.

The solution according to the present disclosure is characterized in a simple construction, which allows controlling the vehicle freely by an independent regulation of rate and direction of the air jet produced by individual fans. The vehicle can ascend, descend, rotate, fly forward and backward.

The drive unit allows application in its various combinations and arrangements, in flying vehicles.

BRIEF DESCRIPTION OF THE DRAWINGS

The subject of the solution is displayed in the embodiment in drawings, where.

DETAILED DESCRIPTION OF THE PREFERRED EMBODIMENTS

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower", "upper", "horizontal," "vertical," "above," "below," "up," "down," "top" and "bottom" as well as derivative thereof (e.g. "horizontally," "downwardly," "upwardly," etc.) should be construed to refer to the orientation as then described or as shown in the drawing under discussion. There relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both moveable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limited combination of features that may exist alone or in other combination of features; the scope of the invention being defined by the claims appended hereto.

This disclosure describes the best mode or modules of practicing the invention as presently contemplated. This description is not intended to be understood in a limiting sense, but provides an example of the invention presented solely for illustrative purposes by reference to the accompanying drawings to advise one of ordinary skill in the art of the advantages and construction of the invention. In the various views of the drawings, like reference characters designate like or similar parts.

Figure 1:
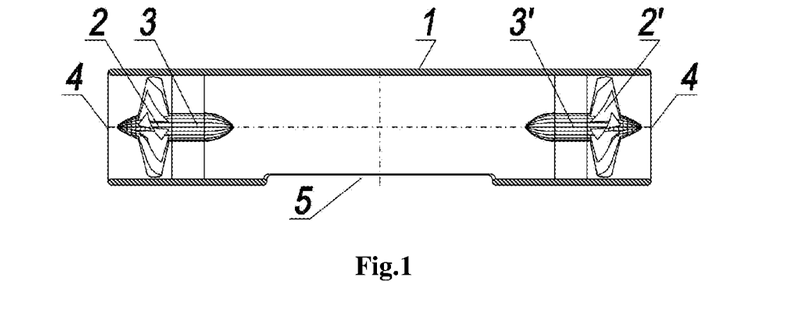
FIG. 1 shows schematically the flying vehicle drive unit in longitudinal section from the side.
Figure 2:
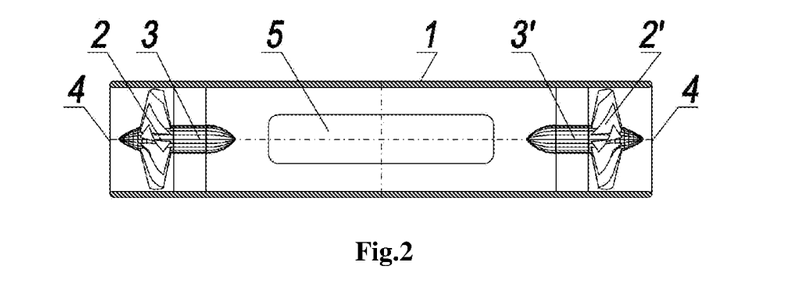
FIG. 2 shows the unit in the longitudinal section from below.
Figure 3:
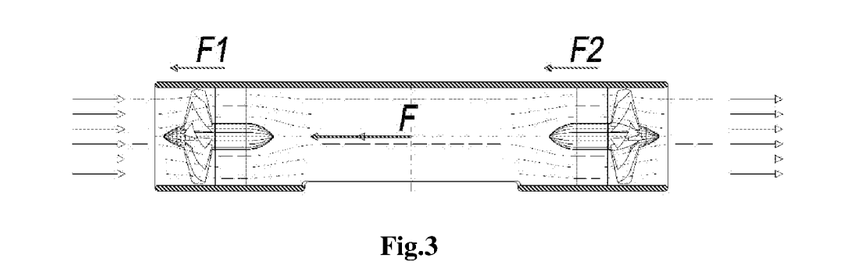
FIG. 3 show the resultant draft force F of the drive unit, with equal draft forces F1 and F2, generated in one direction.
Figure 4:
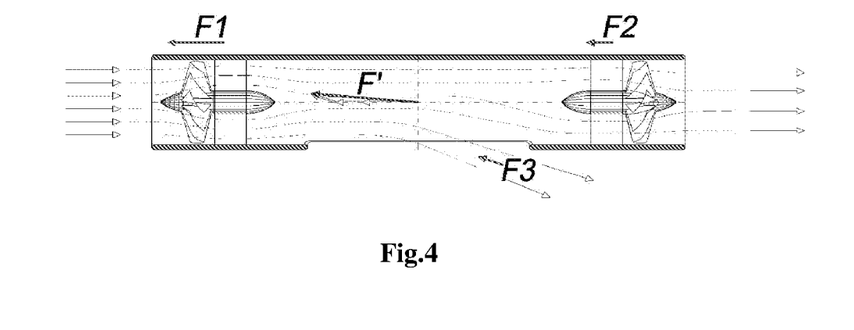
FIG. 4 shows resultant draft force F' of the drive unit, with different draft forces F1 and F2, generated in one direction.
Figure 4A:
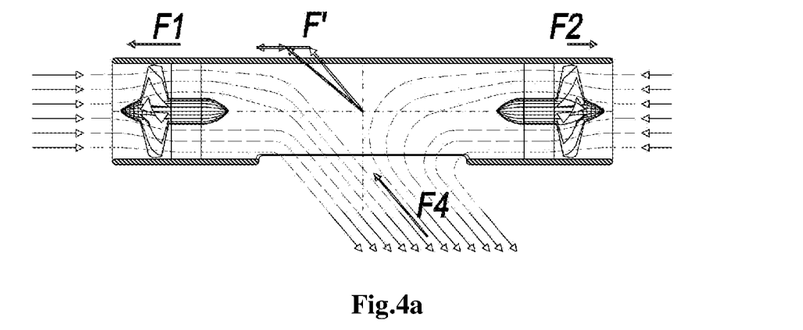
FIG. 4a shows resultant draft force F' of the drive unit deflected in relation to FIG. 4 due to a change of direction of engine 2' draft and the difference of draft forces F1, F2 generated in different directions, where F2<F1.

The flying vehicle drive unit, according to the present solution, presented in FIGS. 1 and 2, is formed by the air channel 1, in the form of a straight segment of a tube with circular section, which has the fans 2 and 2' with engines 3 and 3' fixed on its both ends. The horizontal draft force outlet-inlet nozzles opening 4 is located on both ends of the air channel 1, while the vertical draft force outlet-inlet nozzle opening 5 is placed between the fixed fans 2 and 2' of the drive unit and situated longitudinally in the wall of the central part of the air channel 1.

Differences in the engine 3 and 3' speeds generate different air flows on the fans generating a resultant air flow deflected in relation to the vertical axis of the whole drive unit at an angle of 0° to +/−90°, generating a resultant lifting force $F_3$, $F_4$ (FIG. 4 and FIG. 4a) directed against the air flow.

Figure 5:
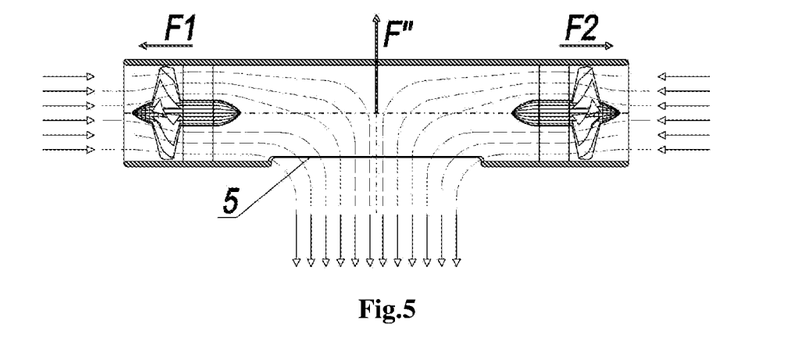
FIG. 5 shows vertical resultant draft force F of the drive unit with equal forces F1, and F2, generated in different directions.

A drive unit in the vertical flight mode, where two fans 2 and 2' operating in different directions with draft forces $F_1$, $F_2$ generate a resultant air flow flowing through the vertical draft force outlet-inlet nozzle opening 5 and directed vertically downward, generating resultant draft force F", is presented in FIG. 5.

Figure 6:
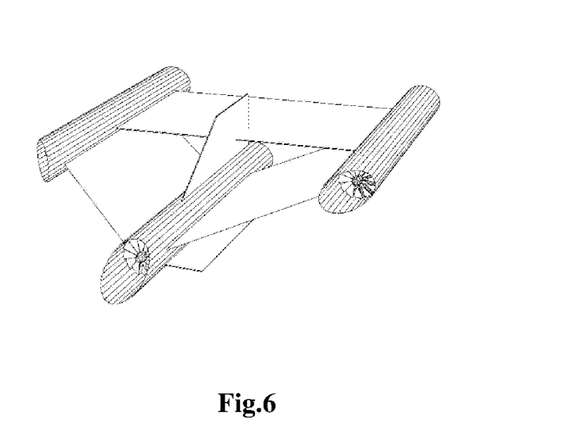
FIG. 6 shows schematically the example of a flying vehicle with the drive unit according to the solution in an axonometric view.
Figure 7:
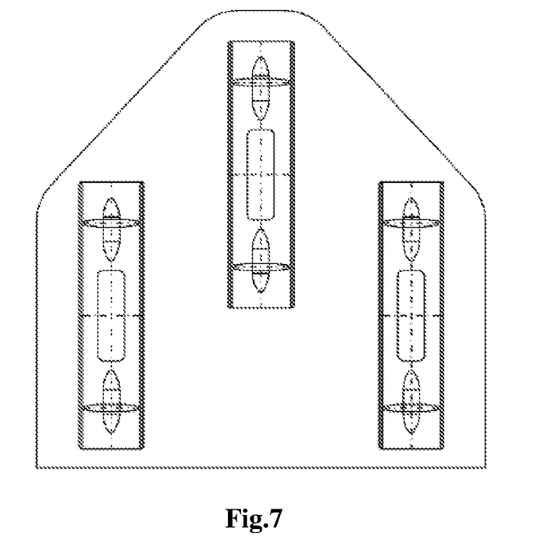
FIG. 7 shows schematically the example of a flying vehicle with three drive units according to the solution in a bottom view.
Figure 9:
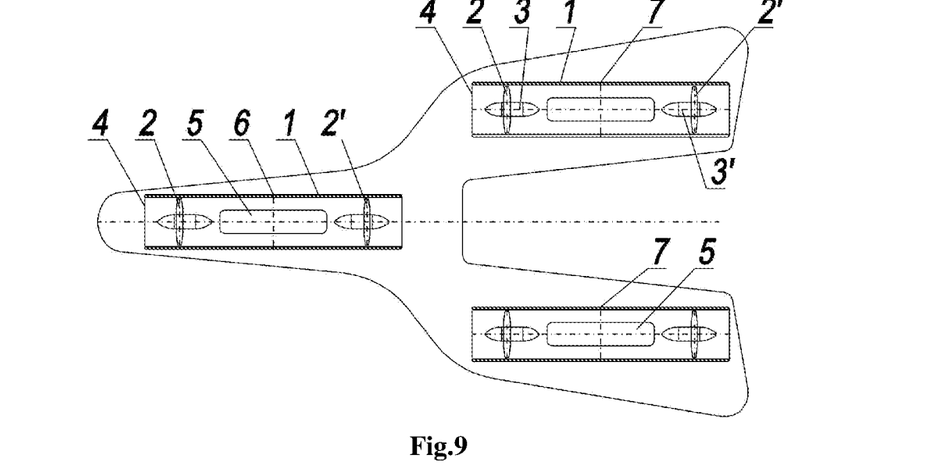
FIG. 9 shows schematically the example of a flying vehicle with three drive units according to the solution in a bottom view with marked front drive unit 6 and two rear drive units 7.

A flying vehicle with the drive unit in delta configuration, where there are three separate air channels 1 with the drives, in the form of a fan 2 or 2' respectively, with engine 3 or 3' fixed on the both ends of the air channels, is presented in FIG. 6, FIG. 7 and FIG. 9.

Figure 8:
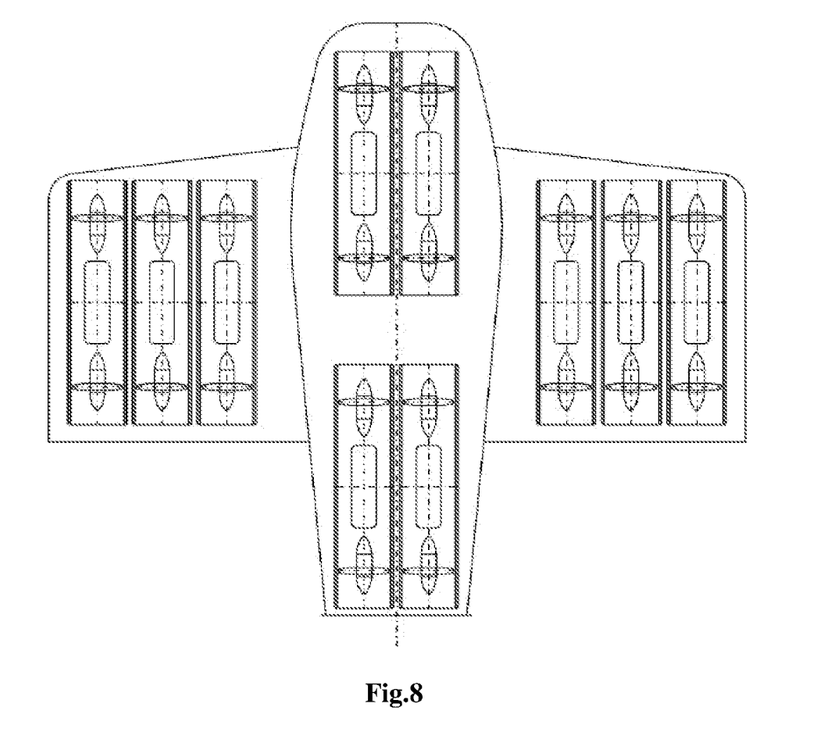
FIG. 8 shows schematically the example of a flying vehicle with ten drive units connected in series into four assemblies according to the solution in a bottom view.

A flying vehicle with drive units connected in series in which there are two assemblies (two composed of three drive units connected in series and two composed of two drive units connected in series), is presented in FIG. 8.

As explained above, a vehicle in delta system with one front drive unit 6 and two rear drive units 7 is presented in FIG. 9.

Figure 10:
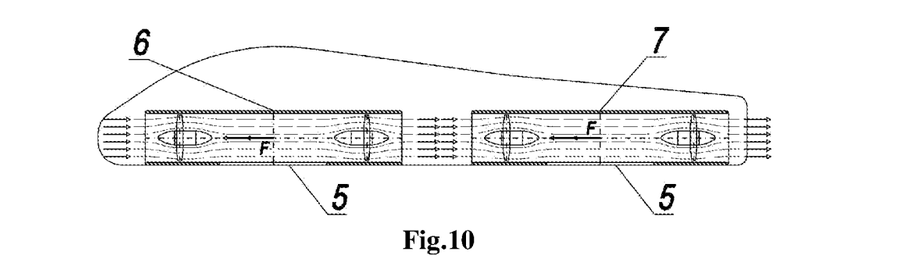
FIG. 10 shows schematically the example of a flying vehicle in a side view with a marked resultant draft force F of each of the drive units directed in one direction forward.

A version of coupling of the drive units, described above in FIG. 9, has also been presented in FIG. 10, where a vehicle in delta system in horizontal flight mode together with forces generated by front drive unit 6 and two rear drive units 7, which generate forces parallel to vehicle axis and directed forward, is shown from the side.

Figure 11:
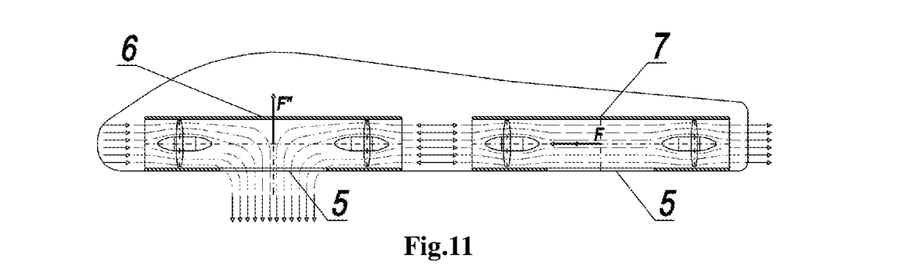
FIG. 11 shows the change of direction of resultant draft force F to vertically upwards for the front drive unit 6.

A change of operation of the front drive unit 6, which generates an air flow perpendicular to the vehicle axis and directed downward, generating an upward force perpendicular to the vehicle axis and directed upward, is presented in FIG. 11. In this mode of operation, the force directed upward in the front of the vehicle will generate torque by lifting the vehicle's nose upwards.

Figure 12:
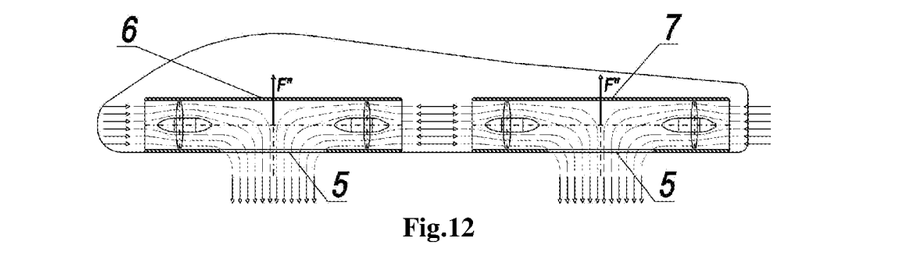
FIG. 12 shows presents the change of direction of resultant draft force F to vertically upwards for the front drive unit 6 and rear drive unit 7.

A change of operation of the rear drive units 7 which, while operating in the same way as the front drive units 6, generate an air flow directed downward generating an upward force perpendicular to the vehicle axis and directed upward, is presented in FIG. 12. In this mode of operation, depending on the draft force, the vehicle may rise, fall or remain hovering.

Figure 13:
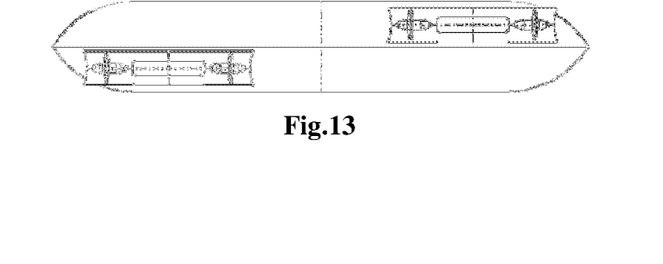
FIG. 13 shows the flying vehicle composed of a central loading box, optional wings and four drive assemblies according to the solution in a side view.
Figure 14:
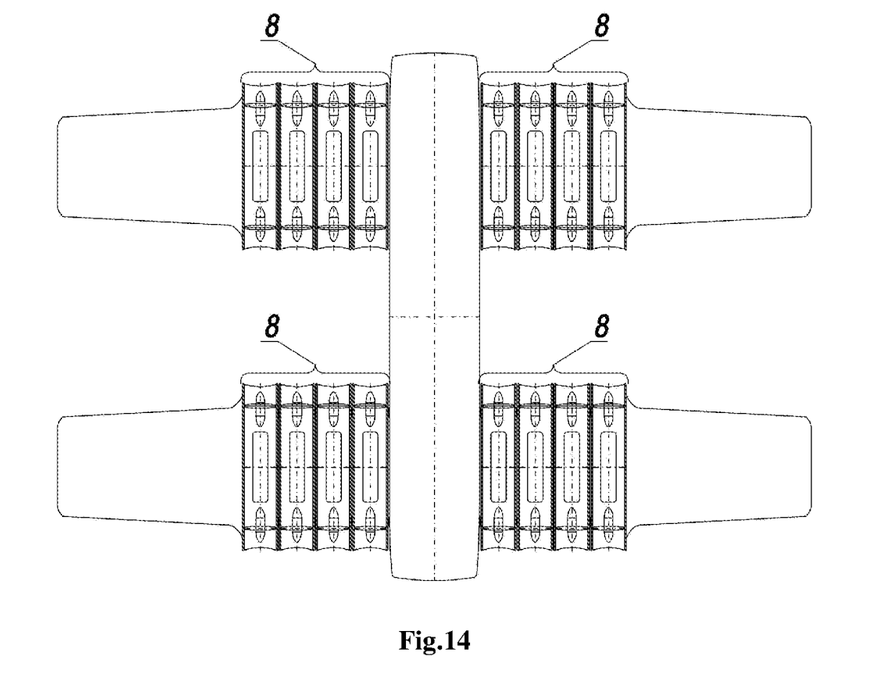
FIG. 14 shows the flying vehicle composed of a central loading box, optional wings and four drive assemblies according to the solution in a bottom view.
Figure 15:
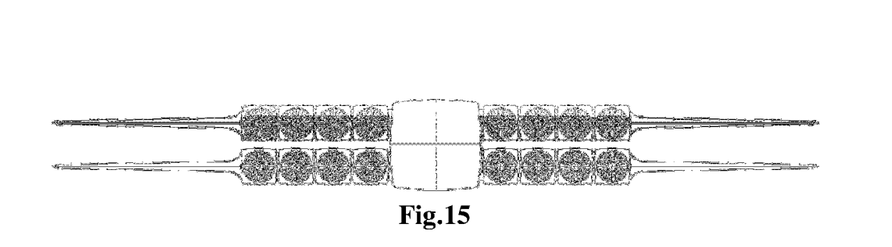
FIG. 15 shows the flying vehicle composed of a central loading box, optional wings and four drive assemblies according to the solution in a front view and similarly in a rear view.

The flying vehicle is composed of: a central loading box, optional wings and four assemblies 8 of the drive units is presented in FIGS. 13, 14 and 15. Each of the assemblies 8 is composed of four drive units. The number of drive units in the assembly 8 may be variable and amounts at least one unit, whereas the number of used drive units results from the required load capacity and maximum mechanical strength of such a system. The wings and the drive units may be detached from the box and the size of the drive units and wings will allow them to be stored inside the box.

Figure 16:
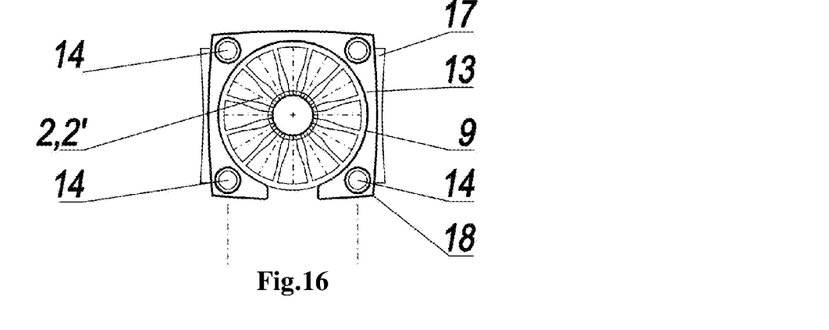
FIG. 16 shows the drive unit equipped with two fans with a housing in a cross-sectional view.
Figure 17:
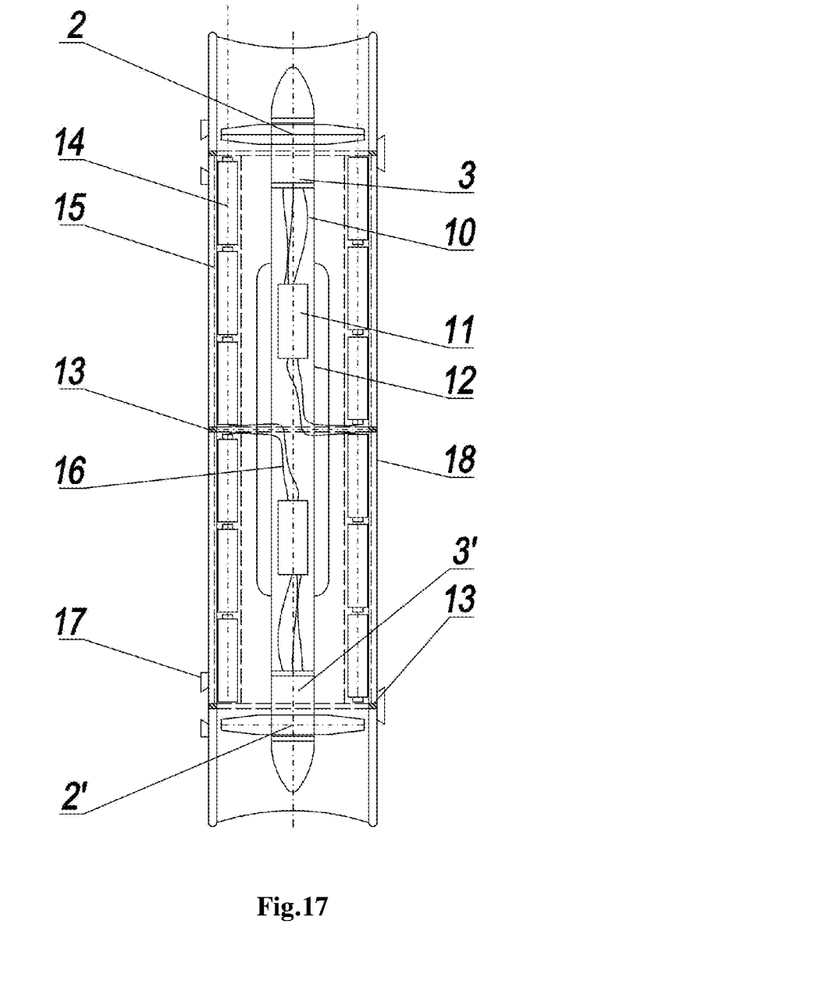
FIG. 17 shows the drive unit equipped with two fans with a housing in a plan view.

A drive unit equipped with two fans 2 and 2' enclosed by a pipe 9 generating air channel is presented in FIGS. 16 and 17. Engines 3 and 3' are connected by cables 10 to a controller 11 and placed in an internal tube 12 located along the longitudinal axis of the drive unit. The transverse stiffening elements 13 form a support for the housing and battery packs 14 arranged in the tubes 15 in the internal space between the pipe 9 generating air channel and the external housing 18.

The battery pack 14 is connected by wires 16 to the controller 11. The external housing 18 is equipped with catches 17 which enable connecting drive units into series.

Depending on directions and force of drafts generated by two fans 2 and 2' installed in the drive unit, the air channel 1, fitted with three openings (i.e. two horizontal draft force outlet-inlet nozzles openings 4 and a vertical draft force outlet-inlet nozzle opening 5), generates a resultant draft in any direction in a vertical plane passing through the axis of the drive unit. Each of the drive units may generate a draft in a different direction in accordance with the control algorithm of the entire vehicle. Owing to this, the vehicle can achieve a stable direction of flight in any direction, i.e. vertical ascending and descending and horizontal forward and backward together with the rotary movement of the entire vehicle.

The drive units according to the application enable construction of the flying vehicles of the vertical take-off in various configurations starting from the drones with three drive units through specific transport vehicles with different payloads to vehicles in a modular system with ability to configure payload and range.

The prototype of the solution filed for protection accurately accomplishes the intended purpose and taken measurements indicate the high efficiency of the entire system in the most difficult mode of the vertical flight, oscillating above 85% efficiency.

Most of the known vehicles of vertical take-off optimize flows and the resulting draft force by using rotary drive elements, rotary wings or by using two drive systems for vertical flight and, separately, for horizontal flight, which generates a significant increase in weight and complexity of the entire construction.

However, the construction according to the present solution is optimal in terms of strength what created possibility of significantly reducing the weight of the entire vehicle, simplifying the entire construction and increasing safety in comparison to the competing solutions.

While the present invention has been described at some length and with some particularity with respect to the several described embodiments, it is not intended that is should be limited to any such particulars or embodiments or any particular embodiment, but it is to be construed with references to be appended claims so as to provide the broadest possible interpretation of such claims in view of the prior art and, therefore, to effectively encompass the intended scope of the invention. Furthermore, the foregoing describes the invention in terms of embodiments foreseen by the inventor for which an enabling description was available, notwithstanding that insubstantial modifications of the invention, not presently foreseen, may nonetheless represent equivalents thereto.

LIST OF ELEMENTS

1. Air channel,
2. Fan (and 2'),
3. Engine (and 3'),
4. Horizontal draft force outlet-inlet nozzle opening,
5. Vertical draft force outlet-inlet nozzle opening,
6. Front drive unit,
7. Rear drive unit,
8. Assembly (composed of four drive units),
9. Pipe (generating air channel),
10. Cable,
11. Controller,
12. Internal tube,
13. Transverse stiffening element,
14. Battery pack,
15. Tube,
16. Wire,
17. Catch,
18. External housing.

The invention claimed is:
1. An air vehicle comprising:
at least one wing,
two drive units,
wherein each drive unit of the two drive units comprises
a straight tube segment of circular section extending between a first end and a second end and forming an air channel therethrough, the first end forming a first circular opening of the straight tube segment, the second end forming a second circular opening of the straight tube segment, a third opening being formed through the straight tube segment,
a first fan positioned at the first end and driven by a first engine,
a second fan positioned at the second and driven by a second engine,
wherein the first fan is adjustable in speed and adjustable such that the first fan may draw air in the first circular opening or exhaust air from the first circular opening, thereby providing independent regulation of rate and direction of an air jet produced by the first fan within the air channel,
wherein the second fan is adjustable in speed and adjustable such that the second fan may draw air in the second circular opening or exhaust air from the second circular opening, thereby providing independent regulation of rate and direction of an air jet produced by the second fan within the air channel,
wherein the third opening is located between the first fan and the second fan and has the contour of a rectangle elongated in a longitudinal direction of the straight tube segment, the third opening forming an outlet of the air channel, wherein the two drive units are configured to be controlled to direct horizontal and vertical movement of the air vehicle.

2. The air vehicle according to claim 1, wherein the contour of the rectangle has rounded corners.

3. The air vehicle according to claim 1, further comprising at least a third drive unit.

4. The air vehicle according to claim 1, wherein each drive unit of the two drive units is equipped with its own independent power supply system comprising a battery pack and a controller.

5. The air vehicle according to claim 1, wherein a housing of each drive unit of the two drive units has built-in catches.

\* \* \* \* \*